United States Patent
Shu et al.

(10) Patent No.: US 9,304,930 B2
(45) Date of Patent: Apr. 5, 2016

(54) HDD WRITE BUFFER ZONE FOR VIBRATION CONDITION

(71) Applicant: Seagate Technology LLC, Cupertino, CA (US)

(72) Inventors: JiaHong Shu, Singapore (SG); Xiang Lu, Singapore (SG); KianKeong Ooi, Singapore (SG); Qiang Bi, Singapore (SG)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/222,277

(22) Filed: Mar. 21, 2014

(65) Prior Publication Data

US 2015/0269081 A1 Sep. 24, 2015

(51) Int. Cl.

| | |
|---|---|
| *G11B 27/36* | (2006.01) |
| *G11B 5/09* | (2006.01) |
| *G06F 12/08* | (2006.01) |
| *G06F 3/06* | (2006.01) |
| *G11B 5/012* | (2006.01) |
| *G11B 20/10* | (2006.01) |
| *G11B 20/12* | (2006.01) |
| *G11B 20/18* | (2006.01) |
| *G11B 27/00* | (2006.01) |
| *G11B 5/596* | (2006.01) |

(52) U.S. Cl.
CPC .......... *G06F 12/0868* (2013.01); *G06F 3/0619* (2013.01); *G06F 3/0656* (2013.01); *G06F 3/0676* (2013.01); *G11B 5/012* (2013.01); *G11B 5/09* (2013.01); *G11B 20/10527* (2013.01); *G11B 20/1217* (2013.01); *G11B 20/1816* (2013.01); *G11B 27/00* (2013.01); *G11B 27/36* (2013.01); *G06F 2003/0691* (2013.01); *G06F 2003/0692* (2013.01); *G06F 2212/1032* (2013.01); *G06F 2212/202* (2013.01); *G06F 2212/21* (2013.01); *G06F 2212/224* (2013.01); *G06F 2212/281* (2013.01); *G06F 2212/313* (2013.01); *G11B 5/59694* (2013.01)

(58) Field of Classification Search
None
See application file for complete search history.

(56) References Cited

U.S. PATENT DOCUMENTS

| | | | | |
|---|---|---|---|---|
| 5,963,392 | A | * | 10/1999 | Sri-Jayantha et al. .......... 360/75 |
| 6,166,884 | A | * | 12/2000 | Eggebeen et al. ............ 360/135 |
| 7,154,690 | B1 | | 12/2006 | Brunnett et al. |
| 7,633,698 | B2 | | 12/2009 | Finamore et al. |
| 7,760,456 | B2 | | 7/2010 | Ding et al. |
| 8,588,041 | B1 | | 11/2013 | Schillinger, Jr. |
| 2009/0164843 | A1 | * | 6/2009 | Wei et al. ........................ 714/15 |
| 2012/0038997 | A1 | | 2/2012 | Jia |
| 2013/0265670 | A1 | | 10/2013 | Judd |

FOREIGN PATENT DOCUMENTS

| | | |
|---|---|---|
| CN | 102662459 | 9/2012 |
| WO | 2008097764 | 8/2008 |

* cited by examiner

*Primary Examiner* — Regina N Holder
(74) *Attorney, Agent, or Firm* — Taylor English Duma LLP (57) ABSTRACT

Technologies are described herein for temporarily writing data to a buffer zone on a recording medium of a storage device when the device is operating in a vibration condition. A vibration condition is detected in the storage device, and upon detecting the vibration condition, data of a current write operation is written to a buffer zone on a recording medium of the storage device, the buffer zone being configured with a lower areal density of storage than primary storage zones on the recording medium. At a later time, an idle condition may be detected in the device, and upon detecting the idle condition, it may be determined whether the vibration condition exists. If it is determined that the vibration condition no longer exists, the data is transferred from the buffer zone to the primary storage zones on the recording medium.

18 Claims, 6 Drawing Sheets

HDD WRITE BUFFER ZONE FOR VIBRATION CONDITION

BRIEF SUMMARY

The present disclosure relates to technologies for temporarily utilizing a buffer zone on a recording medium for write operations during a vibration condition. The technologies may be implemented in a storage device, such as a hard-disk drive ("HDD"), that may be subject to periods of extended vibrations, such as the playing of loud music. According to some embodiments, a method comprises detecting a vibration condition in an HDD device, and upon detecting the vibration condition, writing data of a current write operation to a buffer zone on a recording medium of the HDD device, the buffer zone being configured with a lower areal density of storage than primary storage zones on the recording medium. At a later time, an idle condition may be detected in the device, and upon detecting the idle condition, it may be determined whether the vibration condition exists. If it is determined that the vibration condition no longer exists, the data is transferred from the buffer zone to the primary storage zones on the recording medium.

According to further embodiments, a system comprises a recording medium, and a controller for reading and writing data to the recording medium. The recording medium is formatted with a buffer zone and at least one primary storage zone. The controller is configured to detect a vibration condition in the system, and upon detecting the vibration condition, write data of a current write operation to the buffer zone. The write to the buffer zone may be performed with relaxed write tolerance thresholds as compared to writes to the primary storage zones.

According to further embodiments, a computer-readable medium comprises processor-executable instructions that cause a processor to detect a vibration condition in a storage device, and upon detecting the vibration condition, write data of a current write operation of the storage device to a buffer zone, the buffer zone having a lower areal density of storage than primary storage zones of the storage device. The processor is further caused to detect an idle condition in the storage device, and upon detecting the idle condition, determine whether the vibration condition exists. If it is determined that the vibration condition no longer exists, the data is transferred from the buffer zone to the primary storage zones.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for temporarily writing data to a buffer zone on a recording medium of a storage device, such as an HDD or solid state hybrid drive ("SSHD"), when the device is operating in a vibration condition. Such a vibration condition may occur when the device is exposed to prolonged periods of vibrations, such as during the playing of loud music in close proximity to the device. Maintaining performance of HDDs and other storage devices during vibration is an important requirement for laptop and other computer manufacturers. The requirement is not only to protect the data stored on the HDD, but also to maintain a certain level of write throughput during the vibration condition. A conventional servo subsystem of an HDD may utilize a write fault threshold ("WFT"), an on-cylinder limit ("OCLim"), and/or other write tolerance thresholds to protect against corrupt data being written to the disk. When the write head of the HDD moves beyond these thresholds, as indicated by the positional error signal ("PES") of the servo subsystem, for example, a write fault signal may be issued blocking write operations so that a write operation at a far off-track position does not occur. Under vibration conditions, such as the playing of loud music, the write fault signal may be triggered more frequently than under normal conditions, resulting in lower write throughput.

As the recording density of the recording media in HDDs increases, the write tolerance thresholds may decrease causing the write fault signal to be more easily triggered. Therefore, maintaining write throughput under vibration conditions becomes more challenging as recording density increases. One solution to this problem is to relax the density of tracks (measured in tracks-per-inch ("TPI")) formatted on the recording medium to get better write throughput. However, this also results in lowered storage capacity of the device. Another possible solution is to use controller switching, i.e. use a different servo subsystem to handle the music/vibration conditions than that used in a normal operating environment. This may comprise a software solution with relatively low cost. However, the write throughput improvement of controller switching alone (usually improved to between 20% to around 35% of baseline write throughput) is limited and not able to meet the requirements of many laptop and computer manufacturers (around 50%). Yet another possible solution involves the use of rotational vibration ("RV") sensors and/or linear vibration sensors to sense the vibrations in the device and allow the controller of the device to compensate. RV sensors add additional cost to the device, however, and even when coupled with controller switching, the write throughput is limited to around 45% of baseline in the vibration condition.

The embodiments described herein provide a special buffer zone on the recording medium for the temporary storage of data under vibration conditions. The buffer zone may be allocated on the recording medium during certification testing of the HDD, for example, and may be configured to have relaxed write tolerance thresholds for write operations. In other embodiments, the buffer zone may be implemented as a solid state memory, such as Flash memory or other suitable forms of memory. This solid state memory buffer zone may also be configured with relaxed parameters to facilitate easier and/or quicker writes. The relaxed write tolerances may allow more writes to take place even during excessive vibration, thus maintaining write throughput levels. For example, relaxing WFT from 14% to 20%, together with controller switching, may result in maintaining write throughput levels of 60% of baseline or better in the vibration condition. According to some embodiments, the buffer zone may have a lower areal density of storage than the primary storage area (and consequently, a lower total storage capacity in some embodiments) of the device to allow for successful writing of data at the relaxed write tolerance thresholds. For example, the buffer zone may be formatted with a higher track pitch (i.e., lower TPI) and/or lower BPI, or the controller of the HDD may only write data to every other track in the buffer zone. In further embodiments, the controller of the HDD may use different writing algorithms, encoding schemes, servo subsystems, and/or the like when writing to the buffer zone to account for the relaxed write tolerance thresholds.

Figure 1:
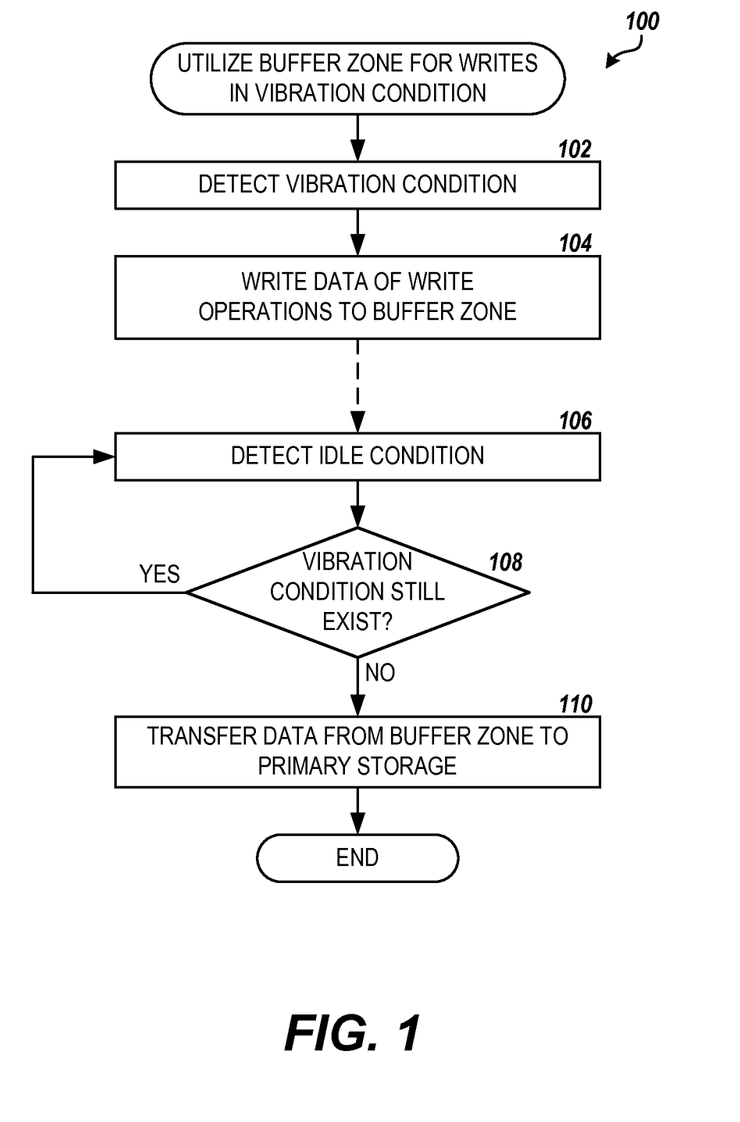
FIG. 1 is a flow diagram showing one method of for temporarily writing data to a buffer zone on a recording medium of a storage device when the device is operating in a vibration condition, according to embodiments described herein.

FIG. 1 illustrates one routine 100 for utilizing a special buffer zone for temporarily writing data in the vibration condition of a storage device, according to some embodiments. The routine 100 may be performed when processing write requests in the storage device, for example. According to some embodiments, the routine 100 may be performed by a controller of the storage device. The routine 100 begins at step 102, where the vibration condition in the storage device is detected. In some embodiments, the vibration condition may be detected from feedback from the servo subsystem of the storage device. For example, a positional error signal exceeding some threshold may indicate that the storage device is being subjected to excessive vibrations. In further embodiments, the vibration condition may be detected by persistent write errors coupled with servo feedback.

Upon detecting the vibration condition in the storage device, the routine 100 proceeds to step 104, where the data from write operation requests received at the storage device are written to the buffer zone. As discussed above, the buffer zone may be formatted on the recording media of the storage device during certification testing of the device and may have a lower areal density of storage than the remainder of the recording media comprising the "primary storage" of the storage device. The data may be written to the buffer zone with relaxed write tolerance thresholds, such as higher WFT or OCLim thresholds, than write operations to the primary storage to prevent blocking of writes to the buffer zone by the servo subsystem during the vibration condition, according to further embodiments.

To maintain the performance under normal operating conditions of the storage device with good on-track quality of the stored data, the controller of the storage device may transfer the data written to the buffer zone to the primary storage at a later time. For example, a background task may be scheduled to rewrite the data in the buffer zone to the primary storage during periods when the storage device is idle and the vibration condition no longer exists. As shown at step 106, an idle condition of the storage device is detected. The idle condition may exist when the storage device is not processing read or write requests from an attached host, for example.

The routine 100 proceeds from step 106 to step 108, where it is determined if the vibration condition still exists. For example, when the servo subsystem detects excessive vibration in the storage device, it may set a flag in the controller indicating the vibration condition. When the vibrations subside, the servo subsystem may reset the flag indicating the vibration condition no longer exists. If the vibration condition no longer exists, the routine 100 proceeds from step 108 to step 110, where the data written to the buffer zone during the vibration condition is transferred to the primary storage. The data may be read from the buffer zone and written to primary storage by the controller on a sector-by-sector, track-by-track, block-by-block, or other basis. Because the data was originally written to the buffer zone with relaxed write tolerance thresholds in the vibration condition, additional procedures may be needed to read the data in the buffer zone to transfer it to primary storage. For example, a special off-track read algorithm or allowance for additional off-track read retries may be necessary for the data written to the buffer zone to be successfully retrieved. This may depend on the read capability of the storage device and may vary based on the type or model of device in which the buffer zone is implemented. From step 110, the routine 100 ends.

Figure 2:
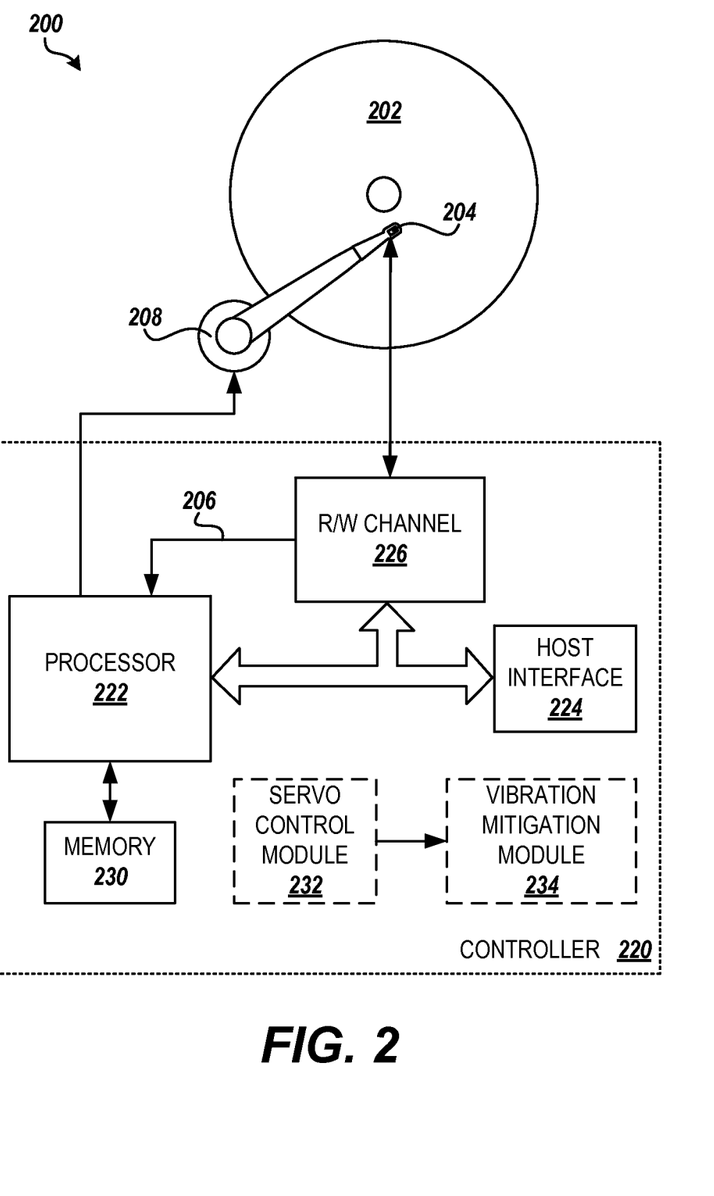
FIG. 2 is a block diagram showing an illustrative environment for temporarily writing data to a buffer zone on a recording medium of a storage device when the device is operating in a vibration condition, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for temporarily writing data to a buffer zone on a recording medium of the device when the device is operating in a vibration condition, according to the embodiments provided herein.

Figure 3:
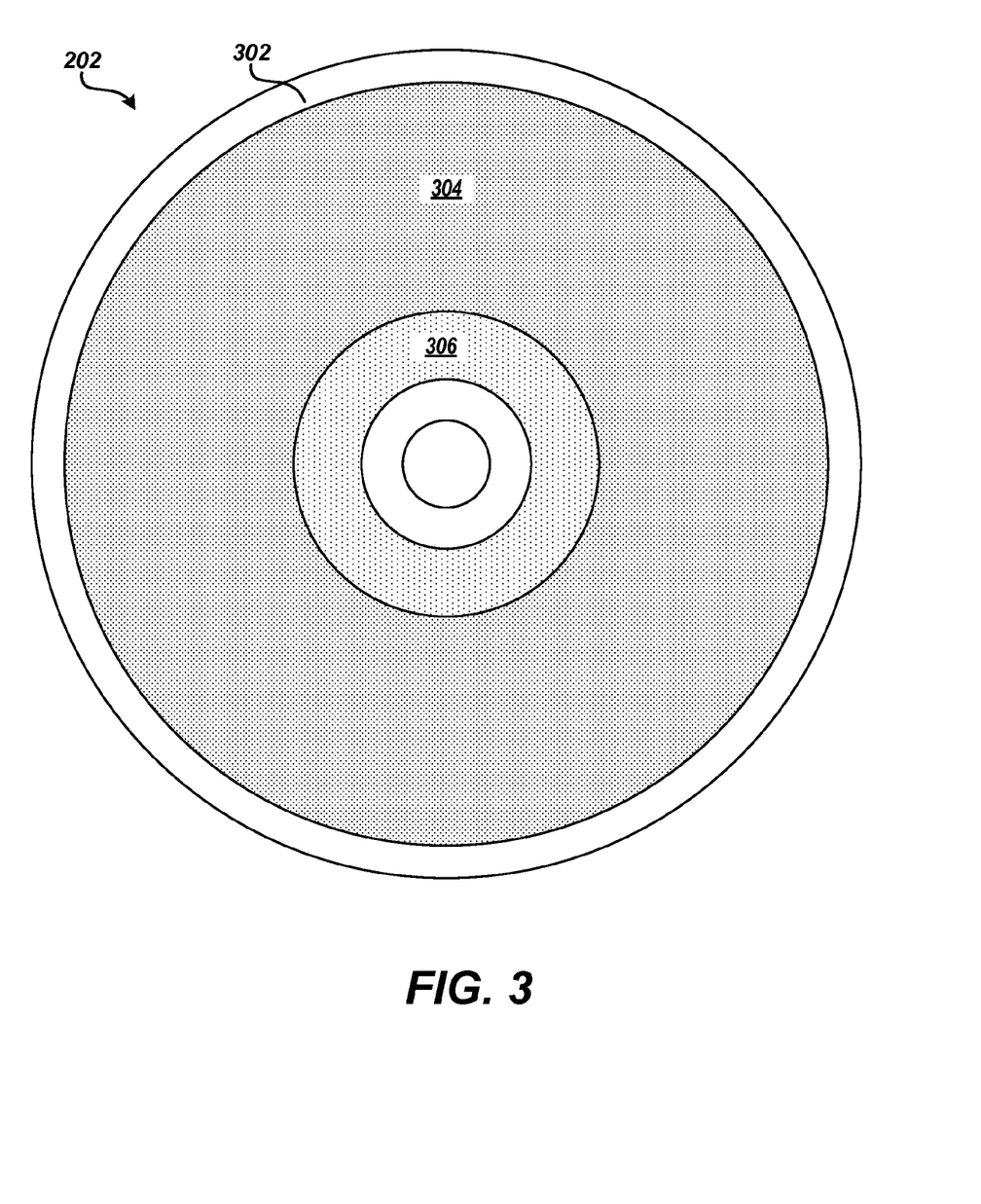
FIG. 3 is a block diagram showing an illustrative layout of primary storage zones and a special buffer zone on disk media, according to embodiments described herein.

The storage device 200 may include recording media comprising at least one platter or disk 202. Each disk 202 of the storage device may comprise one or two magnetic recording surfaces, as shown in FIG. 3. The recording surface(s) 302 of each disk 202 may be formatted into sectors, tracks, and zones for the storage of data. According to some embodiments, the recording surface(s) 302 of one or more disks 202 may be formatted with one or more primary storage zones, such as primary storage zone 304, and a special buffer zone 306. The special buffer zone 306 may be created during certification testing of the storage device 200 and may be sized to allow sufficient storage of data during a vibration condition in the device without significantly reducing the storage capacity of the storage device.

In some embodiments, the buffer zone 306 may have a lower areal density ("AD") of storage than the primary storage zones 304 of the storage device 200 to allow for successful writing of data at the relaxed write tolerance thresholds described above. For example, the buffer zone 306 may be formatted at a lower TPI and/or BPI than the primary storage zones 304. The storage device 200 may include a single buffer zone 306 on a single disk 202, or the buffer zone may be spread across multiple recording surfaces 302 of one or more disks in the device. The buffer zone 306 may be located near the inner radius of the disk 202, towards the outer circumference of the disk, or in some other position or multiple positions on the recording surface 302. The AD, size, location, and other configuration properties of the buffer zone 306 may depend on the reading/writing performance of the storage device 200, the target hosts and environments for the storage device, and the like and may vary based on the model and type of the storage device 200.

Returning to FIG. 2, the storage device 200 further includes at least one read/write head 204 located adjacent to the magnetic recording surface 302 of each disk 202. The read/write head 204 may read information from the disk 202 by sensing a magnetic field formed on portions of the recording surface 302, and may write information to the disk by magnetizing a portion of the surface. It will be appreciated by one of ordinary skill in the art that the read/write head 204 may comprise multiple components, such as one or more magneto-resistive ("MR") or tunneling MR reader elements, an inductive writer element, a slider, multiple sensors, and the like.

The storage device 200 may further comprise a controller 220 that controls the operations of the storage device. The controller 220 may include a processor 222. The controller may further comprise a host interface 224 allowing the storage device 200 to communicate with a host device, other parts of storage device 200, or other components, such as a server computer, personal computer ("PC"), laptop, tablet, game console, set-top box, multi-track audio mixing console, electronic music recording device, automobile navigation system, or any other electronics device that can be communicatively coupled to the storage device 200 to store and retrieve data from the storage device. The processor 222 may process write commands from the host device by formatting the associated data and transfer the formatted data via a read/write channel 226 through the read/write head 204 and to the magnetic recording surface 302 of the disk 202. The processor 222 may further process read commands from the host device by determining the location of the desired data on the recording surface 302, moving the read/write head(s) 204 over the determined location, reading the data from the surface of the disk via the read/write channel 226, correcting any errors and formatting the data for transfer to the host device.

The read/write channel 226 may convert data between the digital signals received at the host interface 224 and/or processed by the processor 222 and the analog signals conducted through the read/write head 204 for reading and writing data to the recording surface 302 of the disk 202. The analog signals to and from the read/write head 204 may be further processed through a pre-amplifier circuit (not shown). As shown at 206, the read/write channel 226 may further provide servo data read from the disk 202 to the processor 222 or other circuitry for controlling an actuator 208, such as a voice-coil motor ("VCM"), that positions the read/write head 204. The read/write head 204 may be positioned to read or write data to a location on the recording surface 302 of the disk 202 by moving the read/write head 204 radially across the disk using the actuator 208 while a motor rotates the disk to bring the target location under the read/write head.

The controller 220 may further include a computer-readable storage medium or "memory" 230 for storing processor-executable instructions, data structures and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). For example, the memory 230 may store a firmware that comprises commands and data necessary for performing the operations of the storage device 200. In addition to the memory 230, the environment may include other computer-readable media storing program modules, data structures, and other data described herein for temporarily writing data to the buffer zone 306 when the storage device 200 is operating in a vibration condition.

It will be appreciated by those skilled in the art that computer-readable media can be any available media that may be accessed by the controller 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, EPROM, EEPROM, FLASH memory, RRAM, STRAM, or other solid-state memory technology; CD-ROM, DVD, BLU-RAY, or other optical storage; magnetic disk storage or other magnetic storage devices; and the like.

The controller 220 may further contain a servo control module 232. The servo control module 232 may utilize the servo data 206 provided by the read/write channel 226 to maintain on-track position of the read/write head 204 by servo action of the actuator 208. The servo control module 232 may comprise a hardware circuit in the controller 220, processor-executable instructions stored in the memory 230 for execution in the processor 222, or any combination of these and other components in the controller 220. According to some embodiments, the servo control module 232 may further be configured to detect excessive vibrations in the storage device and provide an indication to the processor 222 and/or other modules that a vibration condition exists. For example, if the PES in the servo data 206 received from the read/write channel 226 exceeds a certain threshold, the servo control module 232 may set a flag in the controller 220 indicating that the storage device 200 is in a vibration condition. In further embodiments, the controller 220 may contain multiple servo control modules 232, each servo control module configured for use in specific conditions of the storage device 200.

The controller 220 may further contain a vibration mitigation module 234. The vibration mitigation module 234 may implement the embodiments described herein for writing data to the buffer zone 306 when the storage device 200 is operating in a vibration condition, and transferring the data from the buffer zone to primary storage zones 304 during the idle condition. The vibration mitigation module 234 may receive an indication of the vibration condition of the storage device 220 from the servo control module 232, as further shown in FIG. 2. The vibration mitigation module 234 may comprise a hardware circuit in the controller 220, processor-executable instructions stored in the memory 230 for execution in the processor 222, or any combination of these and other components in the controller 220.

It will be appreciated that the structure and/or functionality of the storage device 200 may be different than that illustrated in FIG. 2 and described herein. For example, the processor 222, read/write channel 226, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 4:
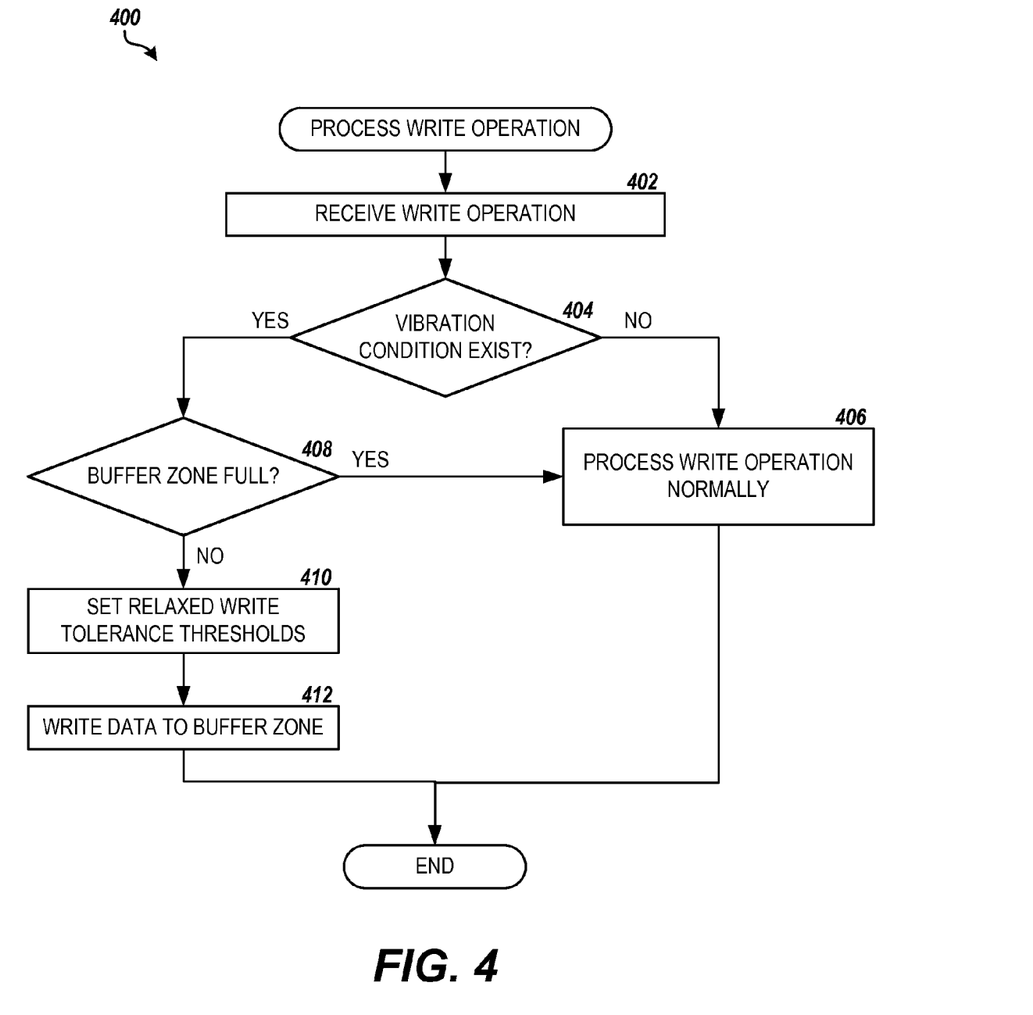
FIG. 4 is a flow diagram showing a routine for writing data to a special buffer zone of a storage device when the device is in a vibration condition, according to embodiments described herein.

FIG. 4 illustrates one routine 400 for writing data to the special buffer zone 306 when the storage device 200 is in the vibration condition, according to some embodiments. The routine 400 may be performed in conjunction with the processing of a write request to the storage device 200. According to some embodiments, the routine 400 may be performed by the vibration mitigation module 234 implemented in the controller 220 of the storage device 200, as described above in regard to FIG. 2. In further embodiments, the routine 400 may be performed by the processor 222 implemented in the controller 220 of the storage device 200, or by any combination of these and/or other components, modules, processors, and devices. The routine 400 begins at step 402, where a write operation is received by the storage device 200. The write operation may be received from a connected host through the host interface 224, for example.

From step 402, the routine 400 proceeds to step 404, where the vibration mitigation module 234 determines if a vibration condition exists in the storage device 200. In some embodiments, the vibration condition may be detected from feedback from the servo subsystem through the servo control module 232. For example, a PES exceeding some threshold may indicate excessive vibration in the storage device 200, caused by close proximity of the device to speakers playing loud music, for example. In further embodiments, the vibration condition may be detected by the presence of persistent write errors coupled with servo feedback or by the presence of any other combination of these and other conditions in the storage device 200. It will be appreciated that other methods of detecting the vibration condition in the storage device 200 may be utilized, such as receiving a signal from RV, linear vibration, or shock sensors in the storage device, and it is intended that all such vibration detection methods be included in this application. When the vibration condition is detected, a flag may be set in the controller 220 indicating the vibration condition. When the vibrations subside, the servo control module 232 may reset the flag indicating the vibration condition no longer exists.

The vibration mitigation module 234 may test the flag to determine the presence of the vibration condition in the storage device 200. If at step 404, the vibration mitigation module 234 determines that the vibration condition does not exist, the routine 400 proceeds to step 406, where the write operation is processed in the normal fashion, e.g., the data is written to the primary storage zone(s) 304 on the disk(s) 202 at the normal write tolerance thresholds. However, if the vibration condition does exist, the routine 400 proceeds to step 408, where the vibration mitigation module 234 checks whether the special buffer zone 306 is full. If the buffer zone 306 is full, then the write is processed normally as described above in regard to step 406. However, if the buffer zone 306 is not full, then the routine 400 proceeds from step 408 to step 410, where the normal write tolerance thresholds are relaxed for the write to the buffer zone 306. As described above, relaxing the write tolerance thresholds may prevent blocking of writes to the buffer zone 306 by the servo subsystem during the vibration condition, thus maintaining write throughput in the storage device 200 while in the vibration condition. According to various embodiments, one or more write tolerance thresholds may be adjusted, including the WFT, OCLim, and other threshold values. For example, the WFT may be increased from a 14% setting for writes to primary storage to 20% for writes to the buffer zone 306, ensuring more writes may take place even while the storage device 200 is experiencing excessive vibrations.

The routine 400 proceeds from step 410 to step 412, where the data for the write operation is written to the buffer zone 306 at the relaxed write tolerance threshold(s). The write operation to the buffer zone 306 may include selecting free storage locations (e.g. blocks or sectors) in the buffer zone 306 for storing of the data and recording the location of the redirected data in the buffer zone 306 in a redirection table in the memory 230 of the controller 220 or in some other storage area of the storage device 200, such as the maintenance cylinders on the disk 202. As described above, the buffer zone 306 may be formatted with a lower AD than the primary storage zone(s) 304 on the disk(s) 202, and thus may have a different sector or block size than the primary storage zones for which the vibration mitigation module 234 must compensate.

According to some embodiments, in addition to writing using the relaxed writing tolerance thresholds, the vibration mitigation module 234 may employ other methods for writing data to the buffer zone 306 to achieve a successful write of the data with the storage device 200 in the vibration condition. For example, the vibration mitigation module 234 may write data to every other data track in the buffer zone 306 to achieve a lower AD of storage in the buffer zone and allow for a wider margin for off-track writing. In some embodiments, the vibration mitigation module 234 may utilize controller switching to further ensure the write is successful in the vibration condition. In other embodiments, the vibration mitigation module 234 may additionally or alternatively utilize different writing algorithms, encoding schemes, and/or the like when writing to the buffer zone 306 to ensure successful writing in the vibration condition. From step 412, the routine 400 ends.

Figure 5:
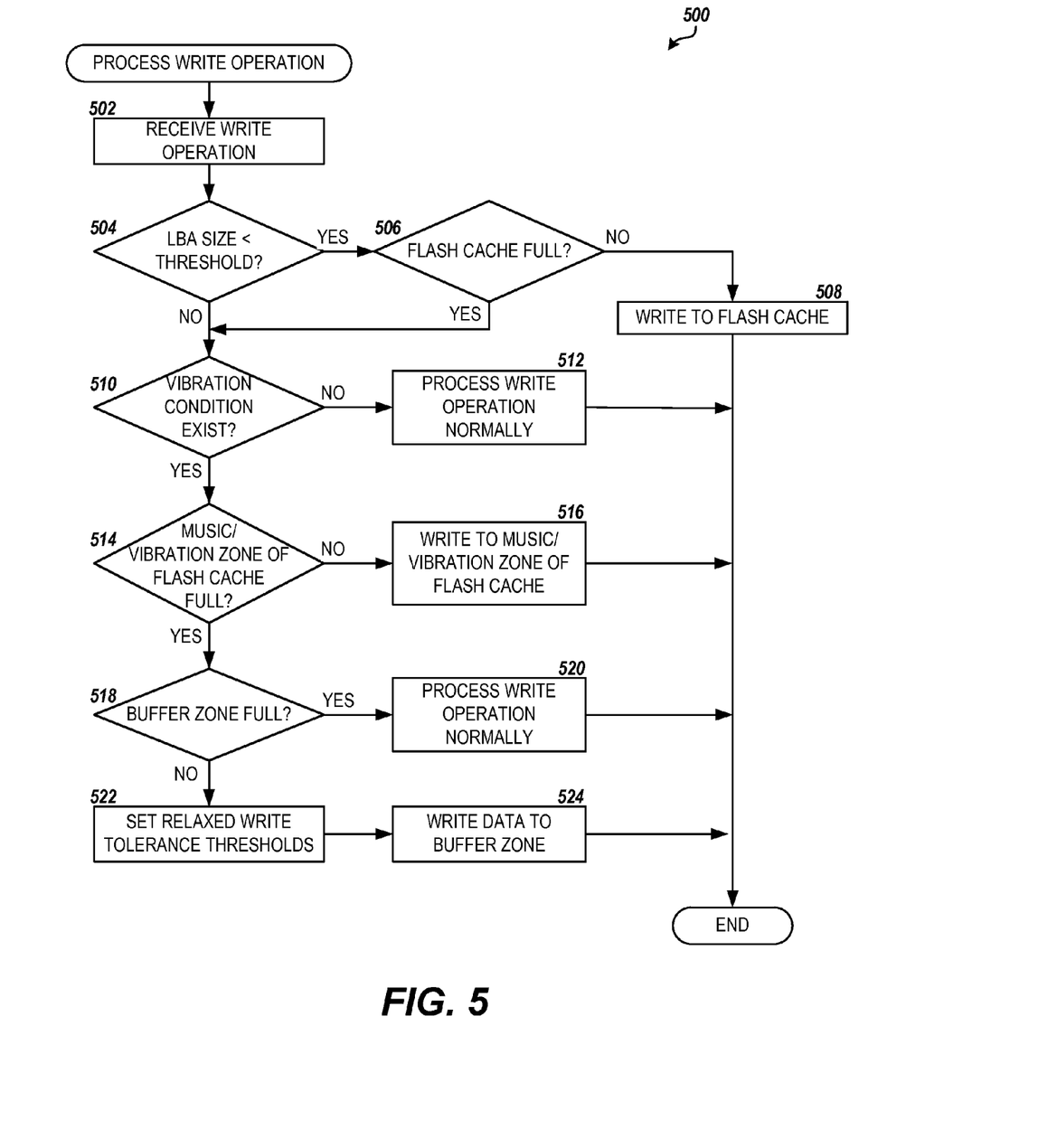
FIG. 5 is a flow diagram showing another routine for writing data to a special buffer zone of a hybrid storage device when the device is in a vibration condition, according to embodiments described herein.

FIG. 5 illustrates another routine 500 for writing data to the special buffer zone 306 when the storage device 200 is in the vibration condition, according to some embodiments. The routine 500 may be performed by the controller 220 of a hybrid storage device 200 that contains both a solid-state storage mechanism (thus not subject to performance degradation in vibration conditions) and a conventional magnetic recording channel such as that described above in regard to FIG. 2. According to some embodiments, the routine 500 may be performed in part by the vibration mitigation module 234 implemented in the controller 220 of the hybrid storage device 200. In further embodiments, the routine 500 may be performed by the processor 222 implemented in the controller 220 of the hybrid storage device 200, or by any combination of these and/or other components, modules, processors, and devices.

The routine 500 begins at step 502, where a write operation is received by the storage device 200. The write operation may be received from a connected host through the host interface 224, for example. From step 502, the routine 500 proceeds to step 504, where it is determined if the logical block addressing ("LBA") size of the write is under a certain threshold. In a hybrid storage device with limited size of solid-state storage, or "flash cache," only writes under a small size of LBA may be written to the solid-state storage under all conditions. If the LBA size is less than the threshold size, then the routine 500 proceeds to step 506 where it is determined whether the solid-state storage is full. If the solid-state storage is not full, then the routine 500 proceeds to step 508 where the data is written to the solid-state storage in a normal fashion. If the solid-state storage of the hybrid storage device 200 is full, then the routine continues to step 510.

If the LBA size is not less than the threshold at step 504, or the solid-state storage is full at step 506, then the routine 500 proceeds to 510, where the vibration mitigation module 234 determines if a vibration condition exists in the hybrid storage device 200. As described above in regard to step 404, the vibration condition may be detected from feedback from the servo subsystem through the servo control module 232. The vibration mitigation module 234 may test a flag set by the servo control modules 232 to determine the presence of the vibration condition in the storage device 200. If the vibration mitigation module 234 determines that the vibration condition does not exist, the routine 500 proceeds to step 512, where the write operation is processed in the normal fashion, e.g., the data is written to the primary storage zone(s) 304 on the disk(s) 202 at the normal write tolerance thresholds.

If the vibration condition does exist, the routine 500 proceeds to step 514, where the vibration mitigation module 234 may check whether a special music/vibration zone of the solid-state storage is full. In a hybrid storage device 200 with sufficient size of solid-state storage, a portion of the solid-state storage may be set aside as a buffer, referred to as the "music/vibration zone," to be used when the device is in the vibration condition. The music/vibration zone of the solid-state storage may be utilized as a primary buffer zone when the device is in the vibration condition, as the excessive vibrations do no affect the write performance to the solid-state storage. If the special music/vibration zone of the solid-state storage is not full, the routine proceeds to step 516 where the vibration mitigation module 234 writes the data to the special music/vibration zone of the solid-state storage.

If the special music/vibration zone of the solid-state storage is full, then the routine 500 proceeds to step 518, where it is determined if the special buffer zone 306 is full. If the buffer zone 306 is full, then the routine 500 proceeds to step 520, where the write operation is processed in the normal fashion, e.g., the data is written to the primary storage zone(s) 304 on the disk(s) 202 at the normal write tolerance thresholds. However, if the buffer zone 306 is not full, then the routine 500 proceeds from step 518 to step 522, where the normal write tolerance thresholds are relaxed for the write to the buffer zone 306. As described above, relaxing the write tolerance thresholds may prevent blocking of writes to the buffer zone 306 by the servo subsystem during the vibration condition, thus maintaining write throughput in the storage device 200 while in the vibration condition.

From step 522, the routine 500 proceeds to step 524, where the data for the write operation is written to the buffer zone 306 at the relaxed write tolerance threshold(s), as described above in regard to step 412. According to some embodiments, in addition to writing using the relaxed writing tolerance thresholds, the vibration mitigation module 234 may employ other methods for writing data to the buffer zone 306 to achieve a successful write of the data with the storage device 200 in the vibration condition. For example, the vibration mitigation module 234 may write data to every other data track in the buffer zone 306 to achieve a lower AD of storage in the buffer zone and allow for a wider margin for off-track writing. In some embodiments, the vibration mitigation module 234 may utilize controller switching to further ensure the write is successful in the vibration condition. From step 524, the routine 500 ends.

Figure 6:
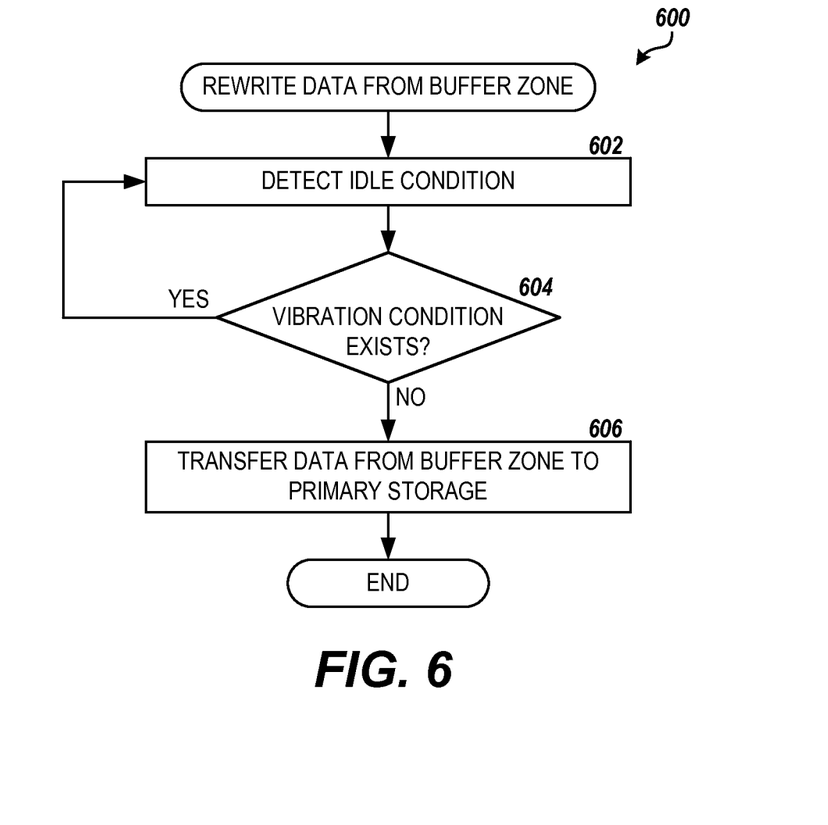
FIG. 6 is a flow diagram showing a routine for rewriting data from the special buffer zone to primary storage during an idle condition of the storage device, according to embodiments described herein.

FIG. 6 illustrates one routine 600 for rewriting the data in the buffer zone 306 to primary storage zone(s) 304 during an idle condition of the storage device 200, according to some embodiments. The routine 600 may be performed in a background process that is run periodically or specifically when an idle condition exists in the storage device 200. According to some embodiments, the routine 600 may be performed by the vibration mitigation module 234 implemented in the controller 220 of the storage device 200. In further embodiments, the routine 600 may be performed by the processor 222 implemented in the controller 220 of the storage device 200, or by any combination of these and/or other components, modules, processors, and devices.

The routine 600 begins at step 602, where the vibration mitigation module 234 detects the idle condition of the storage device 200. The idle condition may exist when the storage device is not processing read or write requests from an attached host, for example. Upon detecting the idle condition, the routine 600 proceeds to step 604, where the vibration mitigation module 234 determines if the vibration condition exists. In some embodiments, the vibration mitigation module 234 may check for the flag set by the servo control module 220 as described above in regard to step 404 in FIG. 4. If the vibration condition still exists, the routine 600 returns to step 602, where the vibration mitigation module 234 waits for a subsequent idle condition in which to perform the rewrite process.

If the vibration condition no longer exists, the routine 600 proceeds from step 604 to step 606, where the vibration mitigation module 234 rewrites the data written to the buffer zone 306 during the vibration condition of the device to the primary storage zone(s) 304 of the storage device 200. In some embodiments, the data may be written to the locations within the primary storage zones 304 originally specified in the write request. The original locations specified for the data redirected to the buffer zone 306 may be recorded in the redirection table described above in regard to step 412 in FIG. 4, for example.

The vibration mitigation module 234 may read the data from the buffer zone 306 and write it to the primary storage zones 304 on a sector-by-sector, track-by-track, block-by-block, or other basis. Because the data was originally written to the buffer zone 306 with relaxed write tolerance thresholds in the vibration condition, additional procedures may be needed for the vibration mitigation module 234 to read the data in the buffer zone. For example, the vibration mitigation module 234 may employ a special off-track read algorithm and/or allow for additional off-track read retries in reading the data from the buffer zone 306 to account for off-track writes and other potential write quality issues that may have occurred while writing the data to the buffer zone in the vibration condition. Further, different decoding schemes or reading algorithms may be employed to read the data from the buffer zone 306 based on the corresponding writing algorithms and encoding schemes employed by the vibration mitigation module 234 to write the data to the buffer zone, as described above in regard to step 412 in FIG. 4. From step 606, the routine 600 ends.

Based on the foregoing, it will be appreciated that technologies for temporarily writing data to a buffer zone on a recording medium of a storage device when the device is operating in a vibration condition are presented herein. While embodiments are described herein in regard to an HDD device, it will be appreciated that the embodiments described in this disclosure may be utilized in any storage device in which writing performance may be affected by exposure to excessive vibrations, including but not limited to, a magnetic disk drive, a hybrid magnetic and solid state drive, a magnetic tape drive, an optical disk storage device, an optical tape drive and the like. The above-described embodiments are merely possible examples of implementations, merely set forth for a clear understanding of the principles of the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
   detecting a vibration condition in a storage device;
   upon detecting the vibration condition, writing data of a current write operation to a buffer zone on a recording medium of the storage device, the buffer zone being configured with a lower areal density of storage than primary storage zones on the recording medium;
   detecting an idle condition of the storage device;
   upon detecting the idle condition of the storage device, determining whether the vibration condition exists; and
   upon determining the vibration condition no longer exists, transferring the data from the buffer zone to the primary storage zones.

2. The method of claim 1, wherein the vibration condition is detected based on a positional error signal from a servo subsystem of the storage device.

3. The method of claim 1, wherein writes to the buffer zone are performed at a higher write fault threshold than writes to the primary storage zones.

4. The method of claim 1, wherein the buffer zone is created during a certification testing of the storage device.

5. The method of claim 1, wherein the buffer zone is formatted at a higher track pitch than the primary storage zones on the recording medium.

6. The method of claim 1, wherein only every other track of the buffer zone is used for writing of the data and the storage device comprises a hard-disk drive ("HDD").

7. The method of claim 1, further comprising:
   perform a servo controller switch in the controller of the storage device in conjunction with writing the data to the buffer zone, the storage device comprising a HDD.

8. A system for storing data comprising:
   a recording medium, the recording medium being formatted with a buffer zone and at least one primary storage zone; and
   a controller for reading and writing data to the recording medium, the controller configured to
   detect a vibration condition in the system, and
   upon detecting the vibration condition, write data of a current write operation to the buffer zone with relaxed write tolerance thresholds.

9. The system of claim 8, wherein the controller is further configured to:
   detect an idle condition in the system;
   upon detecting the idle condition, determine whether the vibration condition exists; and
   upon determining the vibration condition no longer exists, transfer the data from the buffer zone to the at least one primary storage zone.

10. The system of claim 8, wherein the controller detects the vibration condition based on a positional error signal from a servo subsystem of the system.

11. The system of claim 8, wherein relaxing the write tolerance thresholds comprises setting a higher write fault threshold than for writes to the at least one primary storage zones.

12. The system of claim 8, wherein the buffer zone has a lower areal density of storage than the at least one primary storage zone.

13. The system of claim 12, wherein the buffer zone is formatted at a higher track pitch than the at least one primary zone on the recording medium.

14. The system of claim 12, wherein only every other track of the buffer zone is used for writing of data.

15. A non-transitory computer-readable storage medium containing processor-executable instructions that, when executed by a processor, cause the processor to:
   detect a vibration condition in a storage device;
   upon detecting the vibration condition, write data of a current write operation of the storage device to a buffer zone, the buffer zone having a lower areal density of storage than primary storage zones of the storage device;
   detect an idle condition in the storage device;
   upon detecting the idle condition, determine whether the vibration condition exists; and
   upon determining the vibration condition no longer exists, transfer the data from the buffer zone to the primary storage zones.

16. The computer-readable storage medium of claim 15, wherein writes to the buffer zone are performed with relaxed write tolerance thresholds.

17. The computer-readable storage medium of claim 15, wherein writes to the buffer zone are performed at a higher write fault threshold than writes to the primary storage zones.

18. The computer-readable storage medium of claim 15, containing further processor-executable instructions that cause the processor to:
   perform a servo controller switch in a controller of the storage device in conjunction with writing the data to the buffer zone.

* * * * *